(12) United States Patent
Mosko et al.

(10) Patent No.: US 10,075,401 B2
(45) Date of Patent: Sep. 11, 2018

(54) PENDING INTEREST TABLE BEHAVIOR

(71) Applicant: CISCO TECHNOLOGY, INC., San Jose, CA (US)

(72) Inventors: Marc E. Mosko, Santa Cruz, CA (US); Ignacio Solis, South San Francisco, CA (US); Jose J. Garcia-Luna-Aceves, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 485 days.

(21) Appl. No.: 14/662,101

(22) Filed: Mar. 18, 2015

(65) Prior Publication Data
US 2016/0277340 A1 Sep. 22, 2016

(51) Int. Cl.
*H04L 12/58* (2006.01)
*H04L 29/08* (2006.01)
*H04L 29/06* (2006.01)

(52) U.S. Cl.
CPC .............. *H04L 51/16* (2013.01); *H04L 51/14* (2013.01); *H04L 67/2833* (2013.01); *H04L 67/327* (2013.01); *H04L 69/28* (2013.01)

(58) Field of Classification Search
CPC ...................................................... H04L 51/16
See application file for complete search history.

(56) References Cited

U.S. PATENT DOCUMENTS

| 817,441 A | 4/1906 | Niesz |
|---|---|---|
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Haowei Yuan, "Scalable Pending Interest Table Design: From Principles to Practice," 2014.*

(Continued)

*Primary Examiner* — Andrew Georgandellis

(57) ABSTRACT

One embodiment provides a system that facilitates efficient aggregation of multiple interest messages for the same content from multiple predecessors. During operation, an intermediate node receives a first interest message from a predecessor node. The first interest indicates a name for a content object and a lifetime associated with the first interest. The intermediate node identifies an entry in a pending interest table that corresponds to the first interest and determines that the entry has not expired. The intermediate node determines whether a second interest message which indicates a same content object name as the first interest message has been received from the predecessor node. If so, it forwards the first interest. If not, it adds information associated with the predecessor node to the entry. The intermediate node determines a predecessor lifetime associated with the entry and also determines a maximum lifetime associated with the entry.

24 Claims, 8 Drawing Sheets

(56) References Cited

U.S. PATENT DOCUMENTS

| | | |
|---|---|---|
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |

(56) References Cited

U.S. PATENT DOCUMENTS

| | | |
|---|---|---|
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |

(56) References Cited

U.S. PATENT DOCUMENTS

| | | |
|---|---|---|
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turányi |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |

(56) References Cited

U.S. PATENT DOCUMENTS

| | | |
|---|---|---|
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1* | 10/2013 | Zhang .................. H04L 45/74 709/238 |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0181226 A1 | 6/2014 | Xu et al. |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2833581 A1 | 2/2015 |

(56) References Cited

FOREIGN PATENT DOCUMENTS

| | | |
|---|---|---|
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, Paragraph [002] figure 1.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] paragraphs [003]-[006], [0011], [0013] figures 1,2.

Marc Mosko et al "All-in-One Streams for Content Centric Networks", May 24, 2015, retrieved from the Internet: http://www.ccnx.org/pubs/AllinOne.pdf [downloaded Jun. 9, 2016] the whole document.

Cesar Ghali et al. "Elements of Trust in Named-Data Networking", Feb. 13, 2014 Retrieved from the internet Jun. 17, 2016 http://arxiv.org/pdf/1402.3332v5.pdf p. 5, col. 1, p. 2, col. 1-2, Section 4.1; p. 4, col. 2, Section 4.2; p. 4, col. 2.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 The Whole Document.

Sun et al.: "Content-Based Route Lookup Using CAMs", Global Communications Conference, IEEE, Dec. 3, 2012 The Whole Document.

Gelenbe et al.: "Networks With Cognitive Packets", Modeling, Analysis and Simulation of Computer and Telecommunication Systems, 2000. IEEE, Aug. 29, 2000, pp. 3-10.

Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, last paragraph of section II.B.

Smetters et al. "Securing Network Content" Technical Report, PARC TR-2009-1, Oct. 1 2009, Retrieved from the internet URL:http//www.parc.com/content/attachments/TR-2009-01.pdf [retrieved Nov. 1, 2016].

Marc Mosko "CCNx Label Forwarding (CCNLF)" Jul. 21, 2014.

Gallo Alcatel-Lucent Bell Labs "Content-Centric Networking Packet Header Format" Jan. 26, 2015.

Huard J-F et al. "A Programmable Transport Architecture with QOS Guarantees" IEEE Communications Magazine, vol. 36, No. 10, Oct. 1, 1998.

Microsoft Computer Dictionary, Fifth Edition, 2002, Microsoft Press, p. 23.

Mind—A Brief Introduction, John R. Searle, 2004, Oxford University Press, pp. 62-67.

European Exam Report issued in counterpart European Application No. 16158999.9, dated Sep. 28, 2017, 8 pages.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

Wetherall, David, "Active Network vision and reality: Lessons form a capsule-based system", ACM Symposium on Operating Systems Principles, Dec. 1, 1999. pp. 64-79.

(56) References Cited

OTHER PUBLICATIONS

Kulkarni A.B. et al., "Implementation of a prototype active network", IEEE, Open Architectures and Network Programming, Apr. 3, 1998, pp. 130-142.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc.downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (Infocom Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," In Proc. IEEE ICCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.

(56) References Cited

OTHER PUBLICATIONS

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer ScienceVolume 5443 (2009).

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

Gopal et al. "Integrating content-based Mechanisms with hierarchical File systems", Feb. 1999, University of Arizona, 15 pages.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and lain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Sandvine, Global Internet Phenomena Report—Spring 2012. Located online at http://www.sandvine.com/downloads/ documents/ Phenomenal H 2012/Sandvine Global Internet Phenomena Report 1H 2012.pdf.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

(56) References Cited

OTHER PUBLICATIONS

Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pan Dey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Anteniese et al., "Improved Proxy Re-Encryption Schemes with Applications to Secure Distributed Storage", 2006.
Xie et al. "Collaborative Forwarding and Caching in Content Centric Networks", Networking 2012.

\* cited by examiner

|  | NAME 132 | MAX LIFETIME 134 | PREDECESSOR INFORMATION 136 = { PREDECESSOR ID 142 , PREDECESSOR LIFETIME 144 } |
|---|---|---|---|
| PIT ENTRY 131.1 | /a/b/c/d1 | 395 ms | { PRED_ID$_{NODE\ 114}$ , 220 ms } <br> { PRED_ID$_{NODE\ 112}$ , 200 ms } <br> { PRED_ID$_{NODE\ 106}$ , 140 ms } <br> { PRED_ID$_{NODE\ 108}$ , 395 ms } |
| | /e/f/g/h2 | 180 ms | { PRED_ID$_{NODE\ 114}$ , 100 ms } <br> { PRED_ID$_{NODE\ 112}$ , 180 ms } |
| | /j/k/l/m3 | 395 ms | { PRED_ID$_{NODE\ 106}$ , 140 ms } <br> { PRED_ID$_{NODE\ 108}$ , 395 ms } <br> { PRED_ID$_{NODE\ 112}$ , 180 ms } |
| | .... | .... | .... |

PENDING INTEREST TABLE 130

FIG. 1B

| TIME 540 | ACTION 542 | PIT ENTRY 544<br>{Name, Max LT, {Pred}} |
|---|---|---|
| T1=0 | Node A sends INT 502 to Node C | none |
| T2=10 | Node A sends INT 504 to Node C | none |
| T3=80 | Node C receives INT 502; adds PIT entry;<br>sets Pred Lifetime for Pred Node A to 320;<br>sets Max Lifetime to 320; forwards INT 502 | {/a/b, 320 {A, 320}} |
| T4=90 | Node C receives INT 504;<br>sets Pred Lifetime for Pred Node A to 330;<br>sets Max Lifetime to 330; forwards INT 504 | {/a/b, 330 {A, 330}} |
| T5=105 | Node B sends INT 506 to Node C | {/a/b, 320 {A, 320}} |
| T6=115 | Node C receives INT 506;<br>sets Pred Lifetime for Pred Node B to 195 | {/a/b, 330 {A, 330}<br>{B, 195}} |
| T7=145 | Node B sends INT 508 to Node C | {/a/b, 330 {A, 330}<br>{B, 195}} |
| T8=155 | Node C receives INT 508;<br>sets Pred Lifetime for Pred Node B to 235;<br>forwards INT 508 | {/a/b, 330 {A, 330}<br>{B, 235}} |
| T10=235 | Pred Lifetime for Pred Node B expires<br>(Pred Entry B not removed from PIT) | {/a/b, 330 {A, 330}<br>{B, 235}} |
| T11=305 | Node B sends INT 510 to Node C | {/a/b, 330 {A, 330}<br>{B, 235}} |
| T12=315 | Node C receives INT 510;<br>sets Pred Lifetime for Pred Node B to 395;<br>sets Max Lifetime to 395; forwards INT 510 | {/a/b, 395 {A, 330}<br>{B, 395}} |
| T14=330 | Pred Lifetime for Pred Node A expires<br>(Pred Entry A not removed from PIT) | {/a/b, 395 {A, 330}<br>{B, 395}} |
| T16=350 | Node D sends CONTENT OBJ 520<br>corresponding to INT with /name to Node C | {/a/b, 395 {A, 330}<br>{B, 395}} |
| T17=370 | Node C receives CONTENT OBJ 520;<br>removes Pred Entry B from PIT<br>(Pred Entry A not removed from PIT) | {/a/b, 395 {A, 330}} |
| T18=380 | Node B receives CONTENT OBJ 520 | {/a/b, 395 {A, 330}} |
| T19=395 | Max Lifetime for PIT entry expires;<br>remove PIT entry from PIT | none |

FIG. 5B  TABLE 550

PENDING INTEREST TABLE BEHAVIOR

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814"); and U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. Pat. No. 8,204,060, entitled "METHOD AND SYSTEM FOR FACILITATING FORWARDING A PACKET IN A CONTENT-CENTRIC NETWORK," by inventors Van Jacobson and James D. Thornton, filed 17 Dec. 2009 (hereinafter "U.S. Pat. No. 8,204,060"); and U.S. Pat. No. 8,386,622, entitled "METHOD AND APPARATUS FOR FACILITATING COMMUNICATION IN A CONTENT CENTRIC NETWORK," by inventor Van L. Jacobson, filed 11 Dec. 2008 (hereinafter "U.S. Pat. No. 8,386,622");

the disclosures of which are herein incorporated by reference in their entirety.

BACKGROUND

Field

This disclosure is generally related to distribution of digital content. More specifically, this disclosure is related to a system and method for efficiently aggregating multiple interest messages for the same content from multiple predecessors.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. As an interest packet is routed through the network from a content requesting node to a content producing node, each intermediate CCN router adds an entry in its pending interest table (PIT) corresponding to the interest and forwards the interest to the next CCN router. When a matching content object packet is sent from the content producing node back to the requesting node, it follows the reverse path of the interest. Each intermediate CCN router forwards the content object along the requesting interfaces listed in the corresponding PIT entry and subsequently removes the PIT entry, indicating that the interest has been fulfilled.

An intermediate CCN node can receive multiple interests for the same content object (e.g., "similar interest"). A sending node can assign a lifetime for a similar interest based on an estimated round trip travel time for a packet. The intermediate node can receive an initial interest and add a corresponding entry in its PIT. Upon receiving a second or subsequent ("later") similar interest, the intermediate node can aggregate the later interest in the same PIT entry as the initial interest by adding the requesting interface to the existing PIT entry and suppressing the forwarding of the later interest until after the expiration of the lifetime of the initial interest. As a result, an existing PIT entry with a long lifetime may block the forwarding of subsequent similar interests with a shorter lifetime, creating network inefficiency. In addition, interest lifetimes based on variable network metrics may not be reliable and can result in further network inefficiency. Therefore, what is needed is a PIT aggregation mechanism that does not block other requesters and does not require measurements of round trip travel time.

SUMMARY

One embodiment provides a system that facilitates efficient aggregation of multiple interest messages for the same content from multiple predecessors. During operation, the system receives, by an intermediate node, a packet from a predecessor node that corresponds to a first interest message, where the first interest message indicates a name for a content object and a lifetime associated with the first interest message. The intermediate node identifies an entry in a pending interest table that corresponds to the first interest message. Responsive to determining that the entry has not expired, the intermediate node operates as follows: responsive to determining that a second interest message which indicates a same content object name as the first interest message has been received from the predecessor node, the intermediate node forwards the first interest message; responsive to determining that a second interest message which indicates a same content object name as the first interest message has not been received from the predecessor node, the intermediate node adds information associated with the predecessor node to the entry; the intermediate node determines a predecessor lifetime associated with the entry; and the intermediate node determines a maximum lifetime associated with the entry.

In some embodiments, the lifetime associated with the first interest message is based on one or more of: a round trip time; and a subscription time.

In some embodiments, an entry in the pending interest table indicates one or more of: a name; a maximum lifetime; and predecessor information for one or more predecessor nodes, where the predecessor information includes a predecessor identifier and a predecessor lifetime.

In some embodiments, the intermediate node determines that the entry has not expired by determining that an expiration of a maximum lifetime of the entry occurs after a current time.

In some embodiments, the intermediate node determines the predecessor lifetime associated with the entry by determining a new expiration time based on a current time and the lifetime of the first interest message. Responsive to determining that the new expiration time occurs after an expiration of the predecessor lifetime, the intermediate node sets the predecessor lifetime associated with the entry to the new expiration time.

In some embodiments, the intermediate node determines the maximum lifetime associated with the entry by, responsive to determining that an expiration of the predecessor lifetime associated with the entry occurs after an expiration of the maximum lifetime, setting the maximum lifetime associated with the entry to the predecessor lifetime.

In some embodiments, the intermediate node receives a packet that corresponds to a content object corresponding to a matching entry in the pending interest table. The intermediate node determines a valid predecessor node based on the matching entry and forwards the content object to the valid predecessor node based on the predecessor information. The intermediate node removes the predecessor information from the matching entry, and, responsive to determining that no predecessor information remains for the matching entry, removes the matching entry from the pending interest table.

In some embodiments, the intermediate node determines the valid predecessor node by selecting a predecessor node with an expiration of a predecessor lifetime that occurs after a current time.

BRIEF DESCRIPTION OF THE FIGURES

FIG. 1B illustrates an exemplary pending interest table maintained by an intermediate node, in accordance with an embodiment of the present invention.

FIG. 5B presents a table describing the exemplary communication of FIG. 5A, including the state of an exemplary entry in a pending interest table, in accordance with an embodiment of the present invention.

In the figures, like reference numerals refer to the same figure elements.

DETAILED DESCRIPTION

Figure 1A:
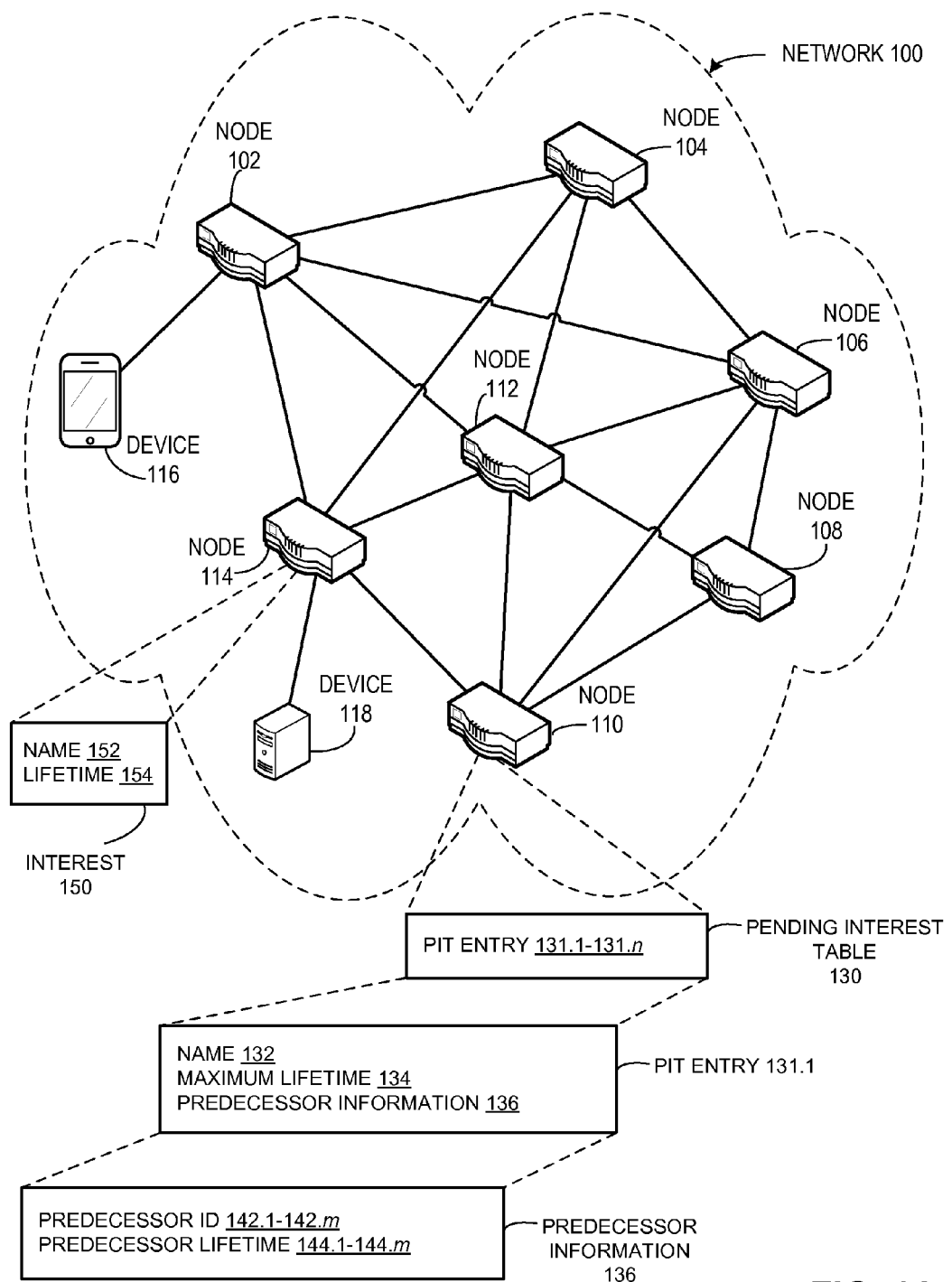
FIG. 1A illustrates an exemplary network that facilitates efficient aggregation of multiple interest messages for the same content from multiple predecessors, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In embodiments of the present invention, the problem of efficiently handling multiple interests for the same data ("similar interests") is solved by maintaining a pending interest table (PIT) that includes a lifetime for each similar interest received from a previous-hop node and a separate aggregation lifetime for the interest. In prior methods of handling similar interests, an intermediate node can aggregate similar interests in a single PIT entry. However, an existing PIT entry with a long lifetime may block or suppress a later similar interest with a short lifetime, resulting in network inefficiency. Previous solutions rely on the intermediate node to track an interest lifetime for each pending similar interest, account for link delays by performing calculations at a granular level based on the lifetime of each pending similar interest, and perform re-transmission (e.g., sending a subsequent similar interest) based on the calculations. In addition, previous approaches may require the intermediate node to cache interest packets, maintain timers for each pending interest, or suppress fewer interests. However, it is neither efficient nor effective for an intermediate node (e.g., a CCN forwarder or router) to perform these tasks.

Embodiments of the present invention solve these inefficiencies by maintaining, by an intermediate node, a pending interest table (PIT) based on whether a similar interest (e.g., an interest that can be fulfilled by the same content object) has already been received from the same previous-hop ("predecessor") node. If so, the intermediate node forwards the interest. If not, the intermediate node aggregates the interest by adding predecessor information to the corresponding PIT entry but does not forward the interest. A PIT entry can include a name, an aggregation lifetime for the interest ("maximum lifetime"), and predecessor information for one or more predecessors ("predecessor entries"). Each predecessor entry can include a lifetime for the interest sent by the predecessor ("predecessor lifetime"). Subsequently, the intermediate node determines whether to update the corresponding PIT entry by extending the predecessor lifetime and/or modifying the maximum lifetime. In this manner, an intermediate node can aggregate the first similar interest received from a predecessor for an existing PIT entry and forward any subsequent similar interests. In addition, updating the maximum lifetime for the PIT entry based on the lifetime of the received interest can extend the maximum lifetime of the interest. By maintaining an interest lifetime per predecessor and an aggregation lifetime for the interest, embodiments of the present invention provide a system in which an existing PIT entry with a long lifetime does not interfere with (e.g., does not suppress) a later similar interest with a shorter lifetime received from a predecessor, thus facilitating the efficient aggregation of multiple interests for the same content from multiple predecessors.

Upon receiving a content object that matches an existing PIT entry, the intermediate node identifies valid predecessor entries (e.g., where the predecessor lifetime has not yet expired). The intermediate node forwards the content object to each corresponding predecessor node and subsequently removes the valid predecessor entry from the PIT entry. If any invalid (e.g., expired) predecessor entries remain in the PIT entry, the intermediate node does not remove them until the maximum lifetime of the entry expires. If the matching content object satisfies all the predecessor entries (e.g., no more predecessor entries remain for the PIT entry), the intermediate node removes the PIT entry, regardless of whether the maximum lifetime of the interest has expired.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Communication

FIG. 1A illustrates an exemplary network 100 that facilitates efficient aggregation of multiple interest messages for the same content from multiple predecessors, in accordance with an embodiment of the present invention. Network 100 can include a content requesting device 116, a content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102 and 114) or a core router (e.g., intermediate CCN routers 104-112). Each CCN router can maintain its own pending interest table (PIT) (e.g., PIT 130 of node 110) and its own forwarding information base (FIB) (not shown). PIT 130 can include PIT entries 131.1-131.$n$ associated with pending interests. A PIT entry (e.g., PIT entry 131.1) can include a name 132, an aggregation lifetime or a maximum lifetime 134, and predecessor information 136. Predecessor information 136 can include predecessor identifiers 142.1-142.$m$ and predecessor lifetimes 144.1-144.$m$ for m predecessor entries.

During operation, node 114 can send an interest 150 in a piece of content to node 110. Interest 150 can include a name 152 and a lifetime 154, which can be measured in a unit of time (e.g., milliseconds). In some embodiments, lifetime 154 is an absolute time. Node 110 can receive interest 150 and update PIT 130 to indicate interest 150 received from predecessor node 114. If a valid (e.g., unexpired) PIT entry exists for a similar interest in PIT 130 and if the predecessor node is not already listed in the PIT entry (e.g., interest 150 is the first similar interest received from predecessor node 114), node 110 updates the existing PIT entry by adding predecessor information for node 114. If the predecessor node is already listed in the PIT entry (e.g., interest 150 is the second or subsequent similar interest received from predecessor node 114), node 110 forwards interest 150 to the next-hop node (e.g., node 108). Intermediate node 110 then updates the PIT entry as described below in relation to FIGS. 2 and 3.

FIG. 1B illustrates an exemplary pending interest table (PIT) 130 maintained by an intermediate node, in accordance with an embodiment of the present invention. Each entry in PIT 130 includes a name 132, a maximum lifetime 134, and predecessor information 136 for one or more predecessors. Predecessor information 136 can include a predecessor identifier 142 and a predecessor lifetime 144. For example, PIT entry 131.1 indicates a pending interest for a content object with a name of "/a/b/c/d1", a maximum lifetime with a value of 395 milliseconds, and predecessor information for four predecessor nodes (e.g., nodes 114, 112, 106, and 108) which have each sent an interest for the same content object. Predecessor information for predecessor node 114 can include a predecessor identifier with a value of "PRED_ID$_{NODE\ 114}$" and a predecessor lifetime with a value of 220 milliseconds. Note that maximum lifetime 134 for PIT entry 131.1 (e.g., 395 ms) is the maximum of all the predecessor lifetimes associated with this PIT entry (e.g., predecessor lifetime 144 with a value of 395 ms for predecessor node 108). In some embodiments, the lifetime and maximum lifetime are measured in absolute time units.

Intermediate Node Processes Multiple Interests for Same Content

Figure 2:
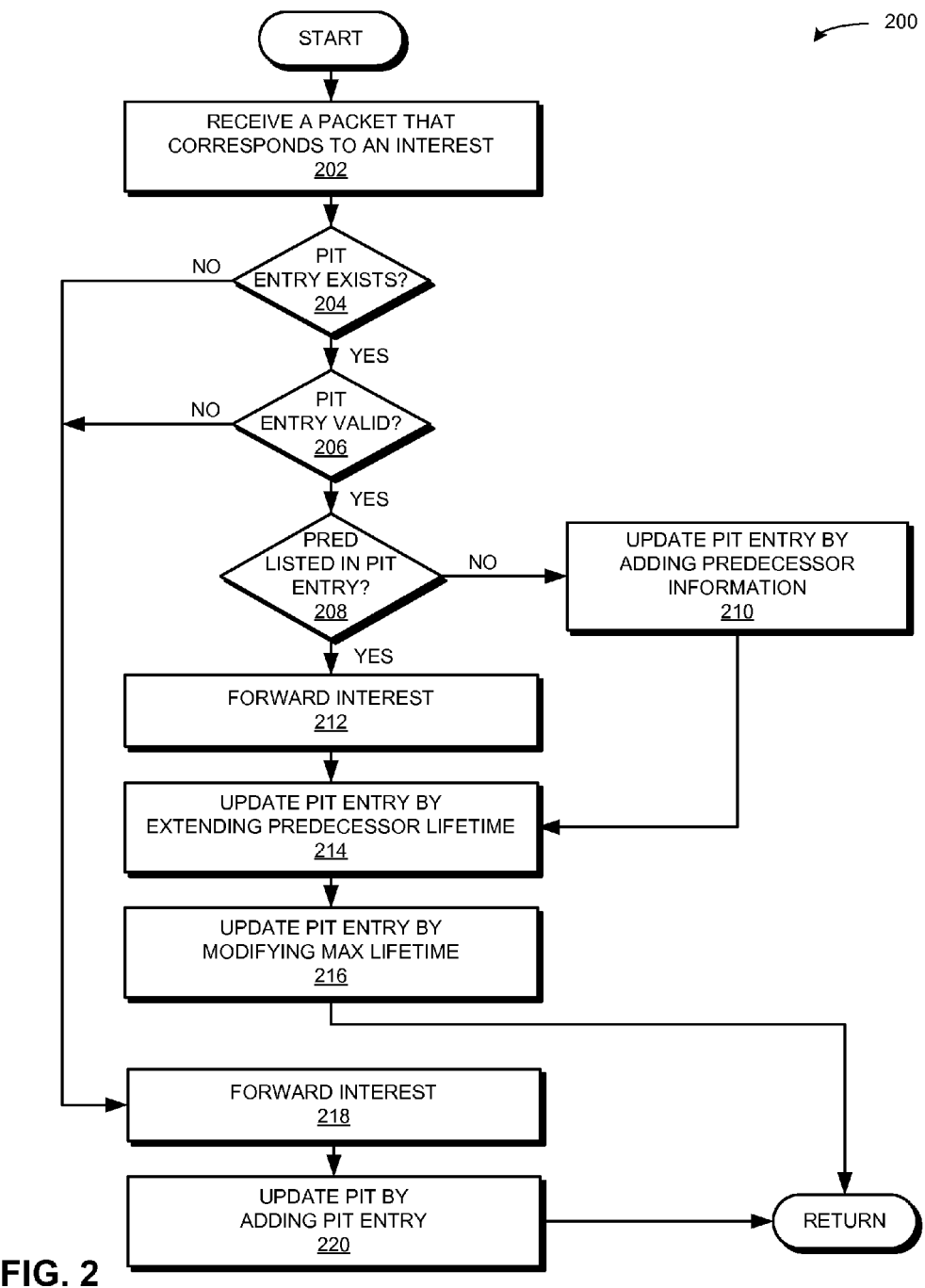
FIG. 2 presents a flow chart illustrating a method by an intermediate node for efficiently aggregating multiple interest messages for the same content from multiple predecessors, in accordance with an embodiment of the present invention.

FIG. 2 presents a flow chart illustrating a method 200 by an intermediate node for efficiently aggregating multiple interest messages for the same content from multiple predecessors, in accordance with an embodiment of the present invention. During operation, the system receives, by an intermediate node, a packet from a predecessor node that corresponds to an interest message (operation 202). The interest message includes a name (which can correspond to a requested content object) and a lifetime for the interest. The interest lifetime can be assigned or determined by a sending node. The interest lifetime can be based on a round trip time which is determined based on network metrics, e.g., an estimated round trip time for a packet to travel between two nodes. The interest lifetime can also be based on a subscription time which is determined based on a length of time for which a sending node is interested in receiving a response. A subscription-based lifetime can be longer (e.g., measured in seconds) than a round trip time-based lifetime (e.g., measured in milliseconds). In addition, because the interest lifetime does not need to be adjusted at each hop, the interest lifetime can be included as part of the signed information of the interest packet. In some embodiments, a lifetime for a received interest, a predecessor lifetime, and a maximum lifetime for the PIT entry are denoted as an absolute time. If the interest message does not include a lifetime field, the intermediate node may use a default value.

The intermediate node determines whether an entry in the PIT exists for the same name as the received interest (decision 204). If not, the intermediate node forwards the interest (operation 218) and updates its PIT by adding an entry that corresponds to the received interest (operation 220). If there is an existing PIT entry for the same name as the received interest, the system determines whether the existing PIT entry is valid (decision 206). For example, the intermediate node determines whether the existing PIT entry has expired by comparing the current time with the maximum lifetime of the existing PIT entry. If the PIT entry is not valid (e.g., has expired), the intermediate node forwards the interest (operation 218) and updates its PIT by adding an entry that corresponds to the received interest (operation 220).

If the PIT entry is valid (e.g., has not expired), the system determines whether the predecessor is listed in the PIT entry (e.g., whether an interest for the same content has been received from the same predecessor) (decision 208). If not (indicating that this received interest is the first such similar interest received from the predecessor), the intermediate node updates the corresponding PIT entry to include the predecessor information (operation 210) and does not forward the interest. The predecessor information can include a predecessor identifier and a predecessor lifetime. The predecessor identifier can indicate an incoming face on which the interest was received or an address for the predecessor node. The system can maintain a mapping between an incoming face and an address of a predecessor node (e.g., a previous-hop node).

If the predecessor is listed in the PIT entry (indicating that the received interest is a second or later interest from the predecessor), the intermediate node forwards the received interest (operation 212). In some embodiments, the intermediate node can apply a data transmission scheduling algorithm (e.g., a token bucket algorithm) to forwarded later interests when multiple predecessors transmit (or the intermediate node receives) later similar interests at approximately the same time. The scheduling algorithm can be local to the intermediate node and not related to the interest lifetime. Subsequently, the intermediate node updates the PIT entry by extending the lifetime of the predecessor (operation 214) and further updates the PIT entry by modifying the maximum lifetime of the PIT entry (operation 216), if certain conditions exist, as described below in relation to FIG. 3.

Figure 3:
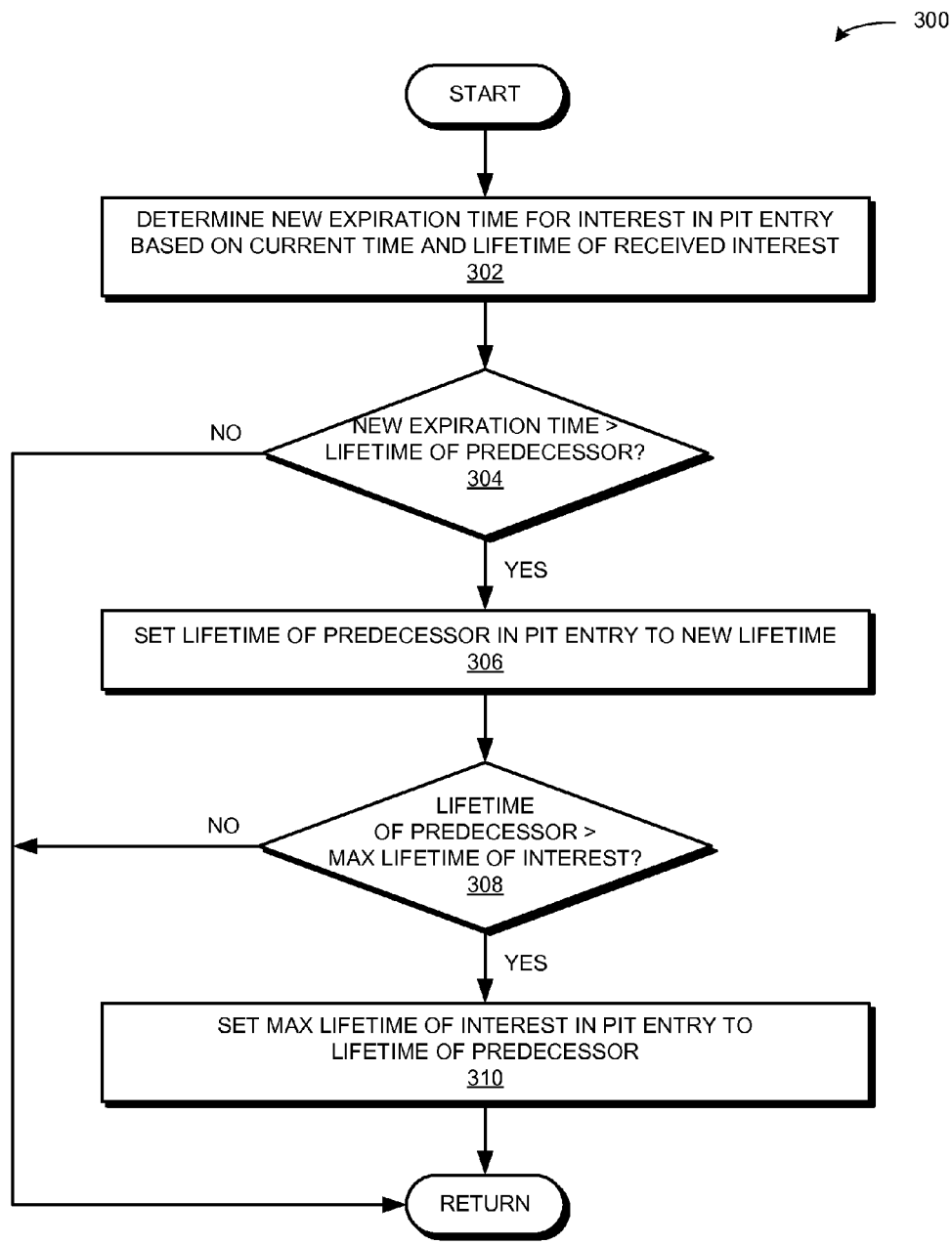
FIG. 3 presents a flow chart illustrating a method by an intermediate node for updating an entry in its pending interest table, in accordance with an embodiment of the present invention.

FIG. 3 presents a flow chart 300 illustrating a method by an intermediate node for updating an entry in its pending interest table (PIT), in accordance with an embodiment of the present invention. Assume that the intermediate node has an existing valid PIT entry (e.g., positive conditions from decisions 204 and 206) that includes a name, a maximum lifetime, and predecessor information, which can include a predecessor identifier and a predecessor lifetime. During operation, the intermediate node receives an interest with a name and a lifetime. The intermediate node can determine a new expiration time for the received interest based on the current time and the lifetime of the received interest (operation 302). In some embodiments, the new expiration time is calculated by adding the lifetime of the received interest to the current time to obtain a new (e.g., absolute) expiration time. The intermediate node determines whether the new expiration time occurs after the expiration of the predecessor lifetime (as listed in the corresponding predecessor entry associated with the PIT entry) (decision 304). If it does, the intermediate node sets the predecessor lifetime in the PIT entry to the new expiration time (operation 306). If it does not, the operation returns.

The intermediate node also determines whether the expiration of the predecessor lifetime occurs after the expiration of the maximum lifetime of the PIT entry (decision 308). If it does, the intermediate node sets the maximum lifetime for the PIT entry to the predecessor lifetime (operation 310). If it does not, the operation returns.

Intermediate Node Processes Matching Content Object

Figure 4:
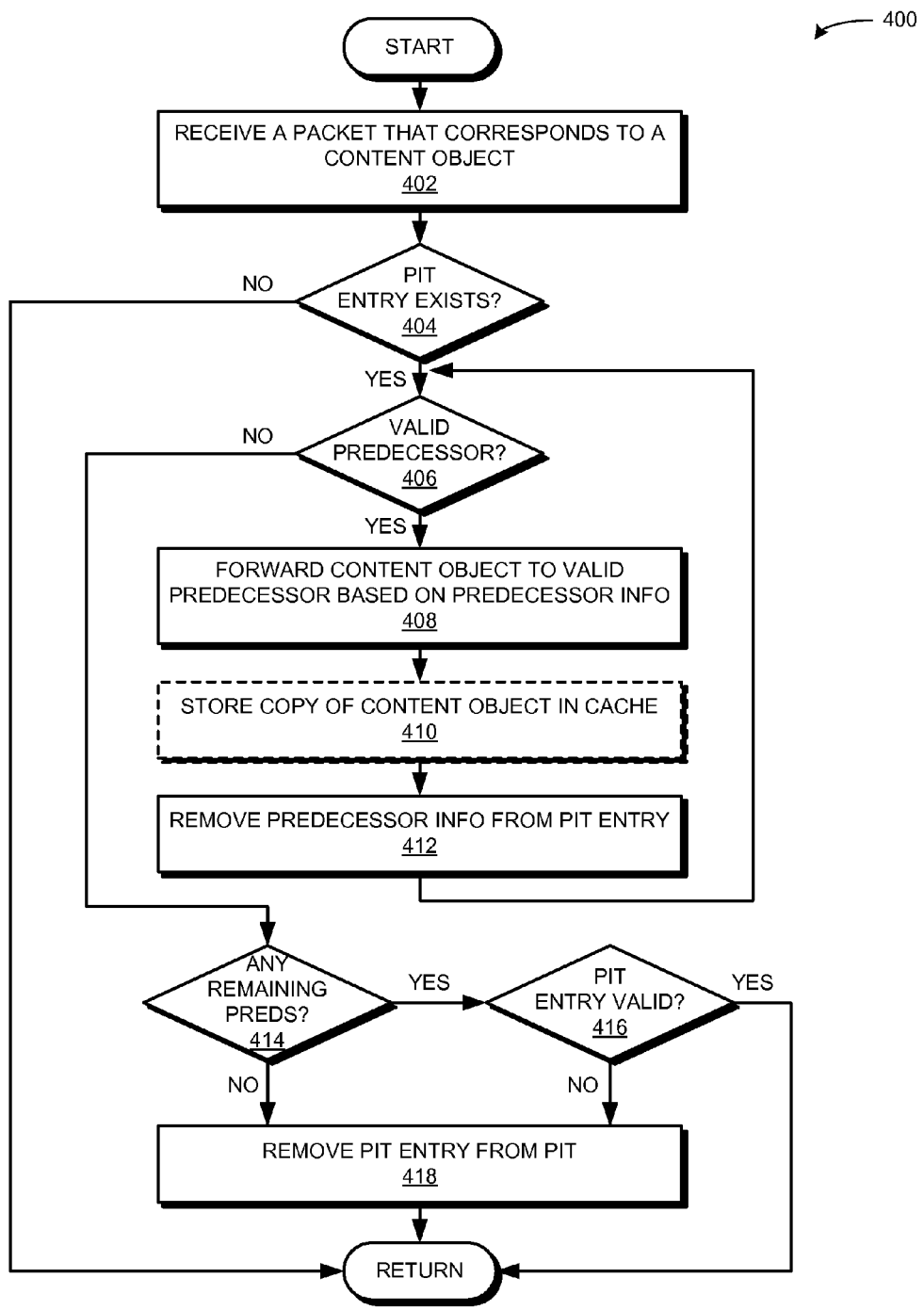
FIG. 4 presents a flow chart illustrating a method by an intermediate node for processing a matching content object, in accordance with an embodiment of the present invention.

FIG. 4 presents a flow chart 400 illustrating a method by an intermediate node for processing a matching content object, in accordance with an embodiment of the present invention. During operation, an intermediate node receives a packet that corresponds to a content object (operation 402). The intermediate node determines whether an entry in the PIT exists that corresponds to the content object (decision 404). For example, the system performs a lookup in the PIT to find a matching PIT entry, e.g., whether there is a PIT entry with the same name as the received content object. If a matching PIT entry does not exist, the intermediate node can drop the content object or store a copy of the content object in anticipation of future content objects (not shown), as described in U.S. Pat. No. 8,204,060, the disclosure of which is herein incorporated by reference. If a matching PIT entry does exist, the intermediate node determines whether a valid predecessor entry exists for the PIT entry (decision 406). For example, for a predecessor entry in the PIT entry, the intermediate node determines whether the predecessor entry has expired by comparing the current time with the predecessor lifetime. If the predecessor entry has not expired, it is considered valid, and if it has expired, it is not considered valid. If the predecessor entry is valid, the intermediate node forwards the content object to the valid predecessor based on the predecessor information (operation 408), which can include a predecessor identifier. As described above, the predecessor identifier can indicate the incoming face on which the interest was received (and thus the face on which the returning content object is to be sent) or can indicate an address for the predecessor node. The system can maintain a mapping between the incoming face and a predecessor node (e.g., a previous-hop node). Optionally, the intermediate node can store a copy of the content object in its cache (operation 410). Subsequently, the intermediate node removes the predecessor entry from the PIT entry (operation 412) and the operation returns to decision 406 (e.g., determining whether there is a valid predecessor).

If no valid predecessor entry exists for the PIT entry, the intermediate node determines whether there are any more remaining predecessor entries for the PIT entry (decision 414). If there are no more remaining predecessor entries, the intermediate node removes the PIT entry from the PIT (operation 418) and the operation returns. If there are any remaining predecessor entries, the intermediate node determines whether the PIT entry is still valid (decision 416). For example, the intermediate node determines whether the existing PIT entry has expired by comparing the current time with the maximum lifetime of the existing PIT entry. If the PIT entry is not valid (e.g., has expired), the intermediate node removes the PIT entry from the PIT (operation 418) and the operation returns. If the PIT entry is valid (e.g., has not expired), the operation returns. In some embodiments, an invalid PIT entry (e.g., expired maximum lifetime) does not exist in the PIT when there are no remaining predecessor entries because a PIT entry (along with any associated predecessor entries) is removed from the PIT upon expiration of the maximum lifetime.

Thus, predecessor entries are removed only when a valid predecessor entry is satisfied by a matching content object or (for any remaining invalid predecessor entries) when the maximum lifetime of the PIT entry expires, resulting in the removal of the PIT entry from the PIT. A respective PIT entry can also be removed from the PIT when it no longer contains any predecessor entries. In addition, an intermediate node can remove a PIT entry when the PIT is full. When the PIT capacity is reached, the intermediate node can recycle entries based on a node-specific eviction algorithm such as a least recently used (LRU) algorithm, where "used" is the time since the last matching request.

Use Case for Aggregation of Multiple Interests for Same Content

Figure 5A:
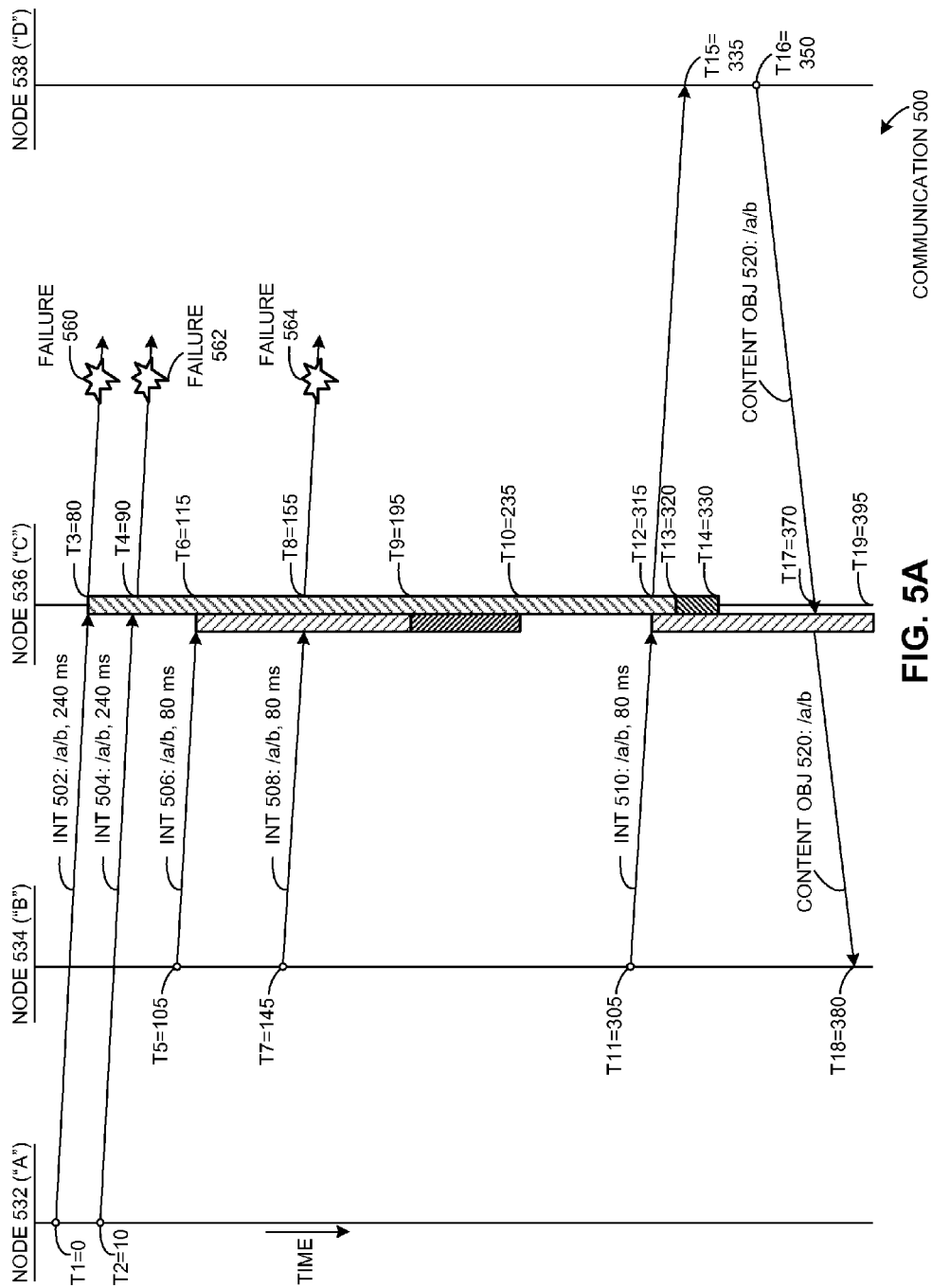
FIG. 5A illustrates exemplary communication with an intermediate node in a network, in accordance with an embodiment of the present invention.

FIG. 5A illustrates an exemplary communication 500 with an intermediate node in a network, in accordance with an embodiment of the present invention. Communication 500 can include communication between a node 532 ("node A"), a node 534 ("node B"), a node 536 ("node C") and a node 538 ("node D"). For example, nodes A and B can create and send interest messages for content corresponding to the same name (e.g., "/a/b"). Node C can be an intermediate node that receives and processes multiple interest messages for the same content (corresponding to the name "/a/b") from predecessor nodes A and B. Node D can be a node that fulfills an interest for the content corresponding to the name "/a/b." The vertical lines beneath nodes A, B, C, and D indicate passage of time. Specific times are denoted by, e.g., "T1=0 milliseconds (ms)," "T2=10 ms", etc. A detailed description of each denoted time, Tx, is provided below in relation to FIG. 5B. Two interests can be "similar" if they correspond to requests for content by the same name or if they can be fulfilled by the same content object. A forwarded packet or interest can result in a failure, e.g., a local port failure, a link failure, or a remote port failure, as shown by failures 560, 562, and 564.

FIG. 5B presents a table 550 describing communication 500 of FIG. 5A, including the state of an exemplary entry in a pending interest table maintained by intermediate node C, in accordance with an embodiment of the present invention. For each time Tx depicted in FIG. 5A, table 500 contains a time 540, an action 542 which corresponds to the actions and/communications that occur at time Tx, and a PIT entry 544 which corresponds to the state of the corresponding PIT entry maintained by intermediate node C at time Tx. The following abbreviations are used in this use case: 1) to denote an interest: "name, lifetime"; and 2) to denote a PIT entry: "{name, maximum lifetime, {predecessor ID, predecessor lifetime}}". In addition, a value of "A" is used to indicate the predecessor identifier for node A and a value of "B" is used to indicate the predecessor identifier for node B. In some embodiments, all depicted times (e.g., each Tx of FIG. 5B) and all lifetimes (e.g., interest lifetimes, maximum lifetimes, and predecessor lifetimes) are indicated in absolute times.

During operation, at time T1=0, node A sends interest 502 (/a/b, 240 ms) to node C. At time T3=80, node C receives interest 502, determines that a PIT entry does not exist for an interest of this name, adds a corresponding PIT entry, sets the predecessor lifetime to 320 (by adding the interest lifetime of 240 to the current received time of 80 to obtain 320), and sets the maximum lifetime for the interest to 320 (shown by the block ending at T13=320). This results in PIT entry 544 at time T3=80 with a value of {/a/b, 320 {A, 320} }. Node C then forwards interest 502 (which can result in failure 560). At time T2=10, node A sends a similar interest 504 (/a/b, 240 ms) to node C. At time T4=90, node C receives interest 504, determines that it is a second or subsequent similar interest from the same predecessor (e.g., node A), and forwards interest 504 (which can result in failure 562). Node C also updates the PIT entry by extending the predecessor lifetime for the corresponding predecessor entry to 330 (by adding the interest lifetime of 240 to the current received time of 90 to obtain 330) and modifying the maximum lifetime to 330. This results in PIT entry 544 at time T4=90 with a value of {/a/b, 330 {A, 330}}.

At time T5=105, node B sends an interest 506 (/a/b, 80 ms) to node C. At time T6=115, node C receives interest 506, determines that a valid PIT entry does exist for an interest of this name, determines that interest 506 is the first similar interest received from this predecessor, and updates the PIT entry by adding the predecessor information. For example, node C sets the predecessor lifetime for B to 195 (by adding the interest lifetime of 80 to the current received time of 115 to obtain 195, shown by the block ending at T9=195). Note that node C does not modify the maximum lifetime of the interest because the predecessor lifetime (195 ms) is set to expire before the maximum lifetime (330 ms), nor does node C forward interest 506. Instead, node C aggregates interest 506 in its PIT entry because interest 506 is the first similar interest received from this predecessor (e.g., node A). This results in PIT entry 544 at time T6=115 with a value of {/a/b, 330 {A, 330} {B, 195}}. At time T7=145, node B sends a similar interest 508 (/a/b, 80 ms) to node C. At time T8=155, node C receives interest 508, determines that it is a second or subsequent similar interest from the same predecessor (e.g., node B), and forwards interest 508 (which can result in failure 564). Node C also updates the PIT entry by extending the predecessor lifetime for the corresponding predecessor entry to 235 (by adding the interest lifetime of 80 to the current received time of 155 to obtain 235). Note that node C does not modify the maximum lifetime of the interest because the predecessor lifetime (235 ms) is set to expire before the maximum lifetime (330 ms). This results in PIT entry 544 at time T8=155 with a value of {/a/b, 330 {A, 330} {B, 235}}. At time T10=235, the expiration of the predecessor lifetime for node B is reached, but the predecessor entry for node B is not removed from PIT entry 544, which at time T10=235 continues to have a value of {/a/b, 330 {A, 330} {B, 235}}.

At time T11=305, node B sends a similar interest 510 (/a/b, 80 ms) to node C. At time T12=315, node C receives interest 510, determines that it is a second or subsequent similar interest from the same predecessor (e.g., node B), and forwards interest 510 (which can successfully reach node D and be fulfilled by a content object 520). Node C also updates the PIT entry by extending the predecessor lifetime for the corresponding predecessor entry to 395 (by adding the interest lifetime of 80 to the current received time of 315 to obtain 395). Note that node C also modifies the maximum lifetime of the interest because the predecessor lifetime (395 ms) is set to expire after the maximum lifetime (330 ms).

This results in PIT entry 544 at time T12=315 with a value of {/a/b, 395 {A, 330} {B, 395} }. At time T14=330, the expiration of the predecessor lifetime for node A is reached, but the predecessor entry for node A is not removed from PIT entry 544, which at time T14=330 continues to have a value of {/a/b, 395 {A, 330} {B, 395}}.

At time T15=335, node D receives interest 510, and at time T16=350, node D sends a matching content object 520 with a name of "/a/b" to node C. At time T17=370, node C receives content object 520, determines that a valid predecessor exists for the corresponding PIT entry (e.g., that the predecessor lifetime for node B has not yet expired), and forwards content object 520 to node B. Note that because the predecessor lifetime for node A has already expired, node C does not forward content object 520 to node A. Also, node C does not remove the predecessor entry for node A from the PIT entry because the maximum lifetime has not expired. Thus, this results in PIT entry 544 at time T17=370 with a value of {/a/b, 395 {A, 330} }. At time T18=380, node B receives content object 520 and acts upon its PIT based on the methods described herein. Because each node traversed by an interest or content object maintains its PIT based on its predecessor nodes, and because each such traversed (e.g., intermediate) node performs the same operations as described herein, the system efficiently aggregates interests at the pending interest table of each intermediate node. Finally, at time T19=395, the maximum lifetime for the PIT entry expires and node C removes the PIT entry (along with the remaining expired predecessor entry for node A) from the PIT.

Exemplary Computer and Communication System

Figure 6:
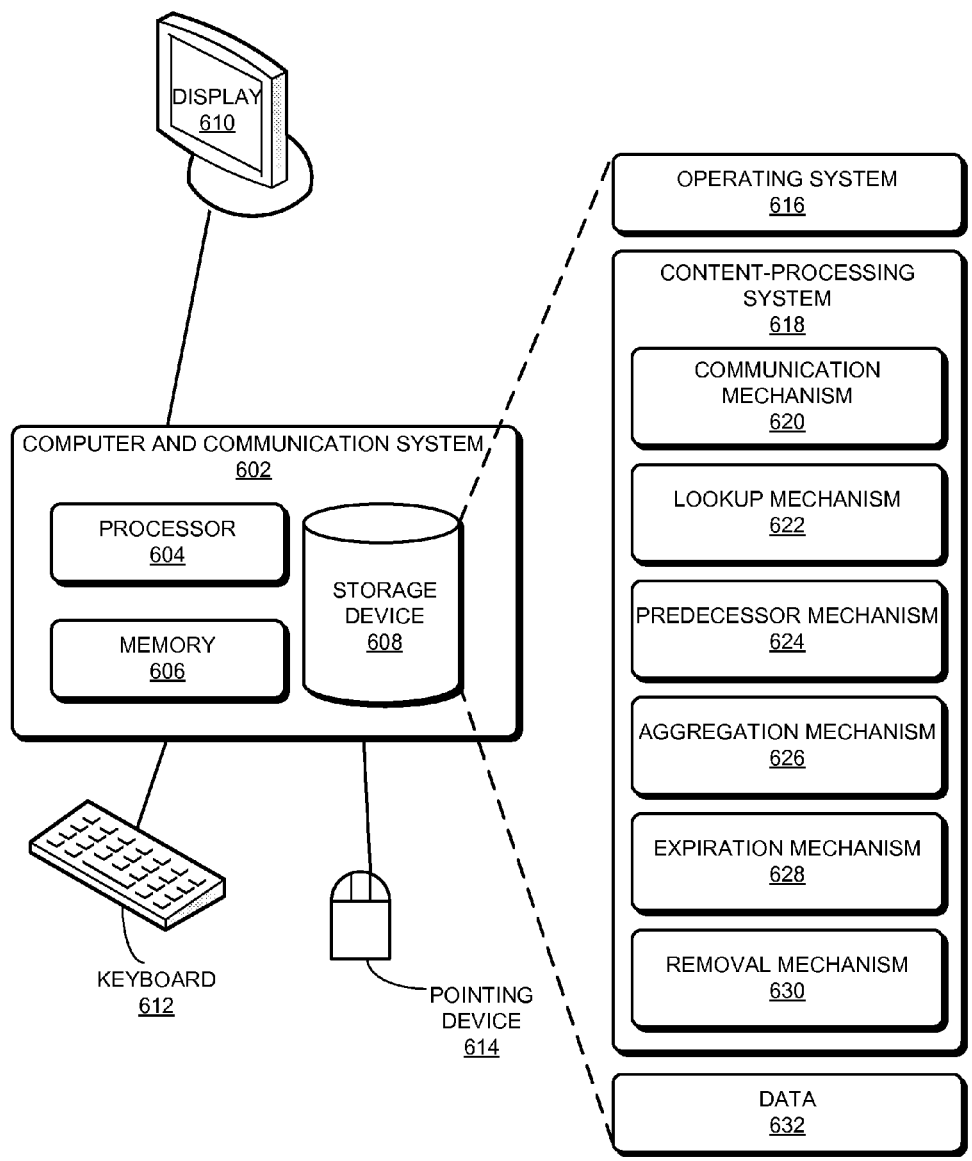
FIG. 6 illustrates an exemplary computer and communication system that facilitates efficient aggregation of multiple interest messages for the same content from multiple predecessors, in accordance with an embodiment of the present invention.

FIG. 6 illustrates an exemplary computer and communication system that facilitates efficient aggregation of multiple interest messages for the same content from multiple predecessors, in accordance with an embodiment of the present invention. Computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a content-processing system 618, and data 632.

Content-processing system 618 can include instructions, which when executed by computer and communication system 602, can cause computer and communication system 602 to perform methods and/or processes described in this disclosure. Specifically, content-processing system 618 may include instructions for receiving, by an intermediate node, a packet from a predecessor node that corresponds to a first interest message (communication mechanism 620) and for identifying an entry in a pending interest table that corresponds to the first interest message (lookup mechanism 622). Content-processing system 618 can include instructions for, responsive to determining that the entry has not expired (lookup mechanism 622), determining whether a second interest message which indicates a same content object name as the first interest message has been received from the predecessor node (lookup mechanism 622). If it has, content-processing system 618 can include instructions for forwarding the first interest message (communication mechanism 620). If it has not, content processing-system 618 can include instructions for adding information associated with the predecessor node to the entry (aggregation mechanism 626). Content-processing system 618 can further include instructions for determining a predecessor lifetime associated with the entry (predecessor mechanism 624). Content-processing system 618 can include instructions for determining a maximum lifetime associated with the entry (expiration mechanism 624).

Content-processing system 618 can additionally include instructions for determining that an expiration of a maximum lifetime of an entry occurs after a current time (expiration mechanism 624). Content-processing system 618 can include instructions for determining a new expiration time based on a current time and the lifetime of the first interest message, and, responsive to determining that the new expiration occurs after an expiration of the predecessor lifetime, setting the predecessor lifetime associated with the entry to the new expiration time (predecessor mechanism 624). Content-processing system 618 can also include instructions for, responsive to determining that an expiration of the predecessor lifetime associated with the entry occurs after an expiration of the maximum lifetime, setting the maximum lifetime associated with the entry to the predecessor lifetime (expiration mechanism 628).

Content-processing system 618 can further include instructions for receiving a packet that corresponds to a content object corresponding to a matching entry in the pending interest table (communication mechanism 620). Content-processing system 618 can include instructions for determining a valid predecessor node based on the matching entry (lookup mechanism 622) and forwarding the content object to the valid predecessor node based on the predecessor information (communication mechanism 620). Content-processing system 618 can also include instructions for removing the predecessor information from the matching entry (removal mechanism 624). Content-processing system 618 can include instructions for, responsive to determining that no predecessor information remains for the matching entry (lookup mechanism 622), removing the matching entry from the pending interest table (removal mechanism 630).

Data 632 can include any data that is required as input or that is generated as output by the methods and/or processes described in this disclosure. Specifically, data 630 can store at least: a packet that corresponds to an interest message; a name for the interest or a content object; a lifetime associated with an interest; a lifetime based on a round trip time; a lifetime based on a subscription time; a pending interest table (PIT); an entry in a pending interest table; a maximum lifetime associated with a PIT entry; a predecessor entry associated with a PIT entry; a predecessor identifier for a predecessor entry; a predecessor lifetime for a predecessor entry; a new expiration time based on a current time and a lifetime of an interest; and a packet that corresponds to a content object.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for forwarding packets, the method comprising:
   receiving, by an intermediate node, a first interest message from a predecessor node, wherein the first interest message indicates a name for a content object and a lifetime associated with the first interest message, wherein the lifetime associated with the first interest message corresponds to a length of time the first interest message is valid;
   determining whether an entry in a pending interest table that corresponds to the first interest message exists, when the entry exists, the entry indicates a maximum lifetime and predecessor information for the predecessor node, wherein the predecessor information includes a predecessor lifetime;
   responsive to determining that the entry exists and is not expired, wherein the entry is not expired when expiration of the maximum lifetime occurs after a current time:
      responsive to determining that a second interest message which indicates a same content object name as the first interest message has been received after the first interest message from the predecessor node, forwarding the first interest message;
      determining an updated predecessor lifetime associated with the entry, wherein the updated predecessor lifetime associated with the entry corresponds to a length of time an interest indicating the content object from the predecessor node is valid;
   responsive to determining that the entry does not exist:
      adding information included in the first interest message to the pending interest table in a new entry; and
   determining the maximum lifetime associated with the entry or the new entry, wherein the maximum lifetime associated with the entry or the new entry corresponds to a longest predecessor lifetime associated with the entry or the new entry.

2. The method of claim 1, wherein the lifetime associated with the first interest message is based on one or more of:
   a round trip time; and
   a subscription time.

3. The method of claim 1, wherein an entry in the pending interest table indicates a name; and wherein the predecessor information further includes a predecessor identifier.

4. The method of claim 1, wherein determining the updated predecessor lifetime associated with the entry further comprises:
   determining a first expiration time based on a current time and the lifetime of the first interest message; and
   responsive to determining that the first expiration time occurs after an expiration of the predecessor lifetime, setting the updated predecessor lifetime associated with the entry to the first expiration time.

5. The method of claim 1, wherein determining the maximum lifetime associated with the entry further comprises:
   responsive to determining that an expiration of the updated predecessor lifetime associated with the entry occurs after an expiration of the maximum lifetime, setting the maximum lifetime associated with the entry to the updated predecessor lifetime.

6. The method of claim 1, further comprising:
   receiving a packet that corresponds to a content object corresponding to a matching entry in the pending interest table;
   determining a valid predecessor node based on the matching entry;
   forwarding the content object to the valid predecessor node based on the predecessor information;
   removing the predecessor information from the matching entry; and
   responsive to determining that no predecessor information remains for the matching entry, removing the matching entry from the pending interest table.

7. The method of claim 6, wherein determining the valid predecessor node comprises:
   selecting a predecessor node with an expiration of the updated predecessor lifetime that occurs after a current time.

8. The method of claim 1, wherein the lifetime associated with the first interest message is included as part of signed information of the first interest message.

9. A non-transitory computer-readable storage medium storing instructions that when executed by a computer cause the computer to perform a method, the method comprising:
   receiving, by an intermediate node, a first interest message from a predecessor node, wherein the first interest message indicates a name for a content object and a lifetime associated with the first interest message, wherein the lifetime associated with the first interest message corresponds to a length of time the first interest message is valid;
   determining whether an entry in a pending interest table that corresponds to the first interest message exists, when the entry exists, the entry indicates a maximum lifetime and predecessor information for the predecessor node, wherein the predecessor information includes a predecessor lifetime;
   responsive to determining that the entry exists and is not expired, wherein the entry is not expired when expiration of the maximum lifetime occurs after a current time:
      responsive to determining that a second interest message which indicates a same content object name as the first interest message has been received after the first interest message from the predecessor node, forwarding the first interest message;
      determining an updated predecessor lifetime associated with the entry, wherein the updated predecessor lifetime associated with the entry corresponds to a length of time an interest indicating the content object from the predecessor node is valid;

responsive to determining that the entry does not exist:
adding information included in the first interest message to the pending interest table in a new entry; and
determining the maximum lifetime associated with the entry or the new entry, wherein the maximum lifetime associated with the entry or the new entry corresponds to a longest predecessor lifetime associated with the entry or the new entry.

10. The storage medium of claim 9, wherein the lifetime associated with the first interest message is based on one or more of:
a round trip time; and
a subscription time.

11. The storage medium of claim 9, wherein an entry in the pending interest table indicates a name; and wherein the predecessor information further includes a predecessor identifier.

12. The storage medium of claim 9, wherein determining the updated predecessor lifetime associated with the entry further comprises:
determining a first expiration time based on a current time and the lifetime of the first interest message; and
responsive to determining that the first expiration time occurs after an expiration of the updated predecessor lifetime, setting the updated predecessor lifetime associated with the entry to the first expiration time.

13. The storage medium of claim 9, wherein determining the maximum lifetime associated with the entry further comprises:
responsive to determining that an expiration of the updated predecessor lifetime associated with the entry occurs after an expiration of the maximum lifetime, setting the maximum lifetime associated with the entry to the updated predecessor lifetime.

14. The storage medium of claim 9, wherein the method further comprises:
receiving a packet that corresponds to a content object corresponding to a matching entry in the pending interest table;
determining a valid predecessor node based on the matching entry;
forwarding the content object to the valid predecessor node based on the predecessor information;
removing the predecessor information from the matching entry; and
responsive to determining that no predecessor information remains for the matching entry, removing the matching entry from the pending interest table.

15. The storage medium of claim 14, wherein determining the valid predecessor node comprises:
selecting a predecessor node with an expiration of the predecessor lifetime that occurs after a current time.

16. The non-transitory computer-readable storage medium of claim 9, wherein the lifetime associated with the first interest message is included as part of signed information of the first interest message.

17. A computer system for facilitating forwarding of packets, the system comprising:
a processor; and
a storage device storing instructions that when executed by the processor cause the processor to perform a method, the method comprising:
receiving, by an intermediate node, a first interest message from a predecessor node, wherein the first interest message indicates a name for a content object and a lifetime associated with the first interest message, wherein the lifetime associated with the first interest message corresponds to a length of time the first interest message is valid;
determining whether an entry in a pending interest table that corresponds to the first interest message exists, when the entry exists, the entry indicates a maximum lifetime and predecessor information for the predecessor node, wherein the predecessor information includes a predecessor lifetime;
responsive to determining that the entry exists and is not expired:
responsive to determining that a second interest message which indicates a same content object name as the first interest message has been received after the first interest message from the predecessor node, forwarding the first interest message;
determining an updated predecessor lifetime associated with the entry, wherein the updated predecessor lifetime associated with the entry corresponds to a length of time an interest indicating the content object from the predecessor node is valid;
responsive to determining that the entry does not exist:
adding information included in the first interest message to the pending interest table in a new entry; and
determining the maximum lifetime associated with the entry or the new entry, wherein the maximum lifetime associated with the entry or the new entry corresponds to a longest predecessor lifetime associated with the entry or the new entry.

18. The computer system of claim 17, wherein the lifetime associated with the first interest message is based on one or more of:
a round trip time; and
a subscription time.

19. The computer system of claim 17, wherein an entry in the pending interest table indicates a name; and wherein the predecessor information further includes a predecessor identifier.

20. The computer system of claim 17, wherein determining the updated predecessor lifetime associated with the entry further comprises:
determining a first expiration time based on a current time and the lifetime of the first interest message; and
responsive to determining that the first expiration time occurs after an expiration of the updated predecessor lifetime, setting the updated predecessor lifetime associated with the entry to the first expiration time.

21. The computer system of claim 17, wherein determining the maximum lifetime associated with the entry further comprises:
responsive to determining that an expiration of the updated predecessor lifetime associated with the entry occurs after an expiration of the maximum lifetime, setting the maximum lifetime associated with the entry to the updated predecessor lifetime.

22. The computer system of claim 17, wherein the method further comprises:
receiving a packet that corresponds to a content object corresponding to a matching entry in the pending interest table;
determining a valid predecessor node based on the matching entry;
forwarding the content object to the valid predecessor node based on the predecessor information;
removing the predecessor information from the matching entry; and responsive to determining that no predecessor information remains for the matching entry, removing the matching entry from the pending interest table.

23. The computer system of claim 22, wherein determining the valid predecessor node comprises:
selecting a predecessor node with an expiration of the predecessor lifetime that occurs after a current time.

24. The system of claim 17, wherein the lifetime associated with the first interest message is included as part of signed information of the first interest message.

* * * * *